US012007727B2

(12) United States Patent
Leith et al.

(10) Patent No.: US 12,007,727 B2
(45) Date of Patent: Jun. 11, 2024

(54) WATCH BAND WITH FIT DETECTION

(71) Applicant: Apple Inc., Cupertino, CA (US)

(72) Inventors: William Leith, San Francisco, CA (US); Daniel W. Labove, San Francisco, CA (US); Rimple Bhatia, Woodside, CA (US); Osamu Yabe, Mountain View, CA (US); Yoji Hamada, Wakayama (JP); Timothy S. Lui, San Jose, CA (US)

(73) Assignee: Apple Inc., Cupertino, CA (US)

( * ) Notice: Subject to any disclaimer, the term of this patent is extended or adjusted under 35 U.S.C. 154(b) by 460 days.

(21) Appl. No.: 17/475,195

(22) Filed: Sep. 14, 2021

(65) Prior Publication Data

US 2023/0079679 A1 Mar. 16, 2023

(51) Int. Cl.
*G04G 21/02* (2010.01)
*G04G 17/08* (2006.01)

(52) U.S. Cl.
CPC ............. *G04G 21/02* (2013.01); *G04G 17/08* (2013.01)

(58) Field of Classification Search
CPC ....................................................... G04G 21/02
See application file for complete search history.

(56) References Cited

U.S. PATENT DOCUMENTS 4,677,521 A * 6/1987 Frazier ..................... A61N 1/14 361/220
6,529,754 B2 * 3/2003 Kondo ............... A61B 5/02438 600/335
8,725,842 B1 * 5/2014 Al-Nasser ........... G06F 3/04883 709/219
9,442,525 B2 * 9/2016 Choi ..................... A61B 5/1118
9,609,921 B1 4/2017 Feinstein
9,781,984 B2 10/2017 Baranski
9,904,254 B1 * 2/2018 Hariri .................. G04G 9/0064
(Continued)

FOREIGN PATENT DOCUMENTS

JP 2012-122941 A 6/2012
JP 2015-159347 9/2015
(Continued)

OTHER PUBLICATIONS

Japanese Office Action from Japanese Patent Application No. 2022-140992, dated Oct. 20, 2023, 14 pages including English language translation.

(Continued)

*Primary Examiner* — Lisa Lea-Edmonds
(74) *Attorney, Agent, or Firm* — BAKERHOSTETLER

(57) ABSTRACT

Characteristics of a watch band can change when placed in different configurations, and each of these characteristics can be correlated with each of the various configurations. The characteristics can be measured to detect in which of the various configurations the watch band is in. For example, the watch band can include an adjustable capacitor that changes it capacitance when the watch band changes its configuration. For example, the capacitance can change based on stretching of the watch band, bending of the watch band, and/or securement and release of an engagement element. The watch or another device can perform one or more operations based on the detected characteristic and configuration of the watch band.

20 Claims, 7 Drawing Sheets

(56) References Cited

U.S. PATENT DOCUMENTS

| | | | | |
|---|---|---|---|---|
| 9,939,784 | B1 | 4/2018 | Berardinelli | |
| 10,123,710 | B2 * | 11/2018 | Gassoway | A61B 5/02438 |
| 10,136,857 | B2 * | 11/2018 | Nuovo | A61B 5/318 |
| 10,149,521 | B2 * | 12/2018 | Baranski | A44C 5/0069 |
| 10,152,082 | B2 * | 12/2018 | Bailey | G06F 1/1656 |
| 10,175,653 | B1 * | 1/2019 | Bloom | G04B 45/00 |
| 10,284,763 | B2 * | 5/2019 | Kim | G04B 47/06 |
| 10,303,122 | B2 * | 5/2019 | Choi | G04C 10/00 |
| 10,367,300 | B2 * | 7/2019 | Shedletsky | G04G 17/04 |
| 10,401,800 | B2 * | 9/2019 | Cardinali | G04G 21/00 |
| 10,444,791 | B2 * | 10/2019 | Cobbett | G06Q 10/0639 |
| 10,488,936 | B2 * | 11/2019 | Baranski | A61B 5/11 |
| 10,973,424 | B2 * | 4/2021 | Lee | H01M 10/0431 |
| 11,003,289 | B1 * | 5/2021 | Hsu | G06F 1/169 |
| 11,320,789 | B1 * | 5/2022 | Trapero Martin | A61B 5/7435 |
| 11,442,413 | B2 * | 9/2022 | Mitsugi | A44C 5/0015 |
| 11,442,503 | B2 * | 9/2022 | Hsu | G06F 1/1652 |
| 11,526,133 | B2 * | 12/2022 | Vasavada | G04B 37/1486 |
| 11,540,599 | B1 * | 1/2023 | Yokoyama | A44C 27/008 |
| 11,602,201 | B1 * | 3/2023 | Slabaugh | A44C 5/0069 |
| 11,652,509 | B1 * | 5/2023 | Hiemstra | A44C 5/147<br>343/720 |
| 11,662,692 | B2 * | 5/2023 | Vasavada | G06F 1/1632<br>368/282 |
| 11,666,124 | B2 * | 6/2023 | Lui | A44C 5/185<br>368/282 |
| 11,760,375 | B2 * | 9/2023 | Do | G06F 3/0482<br>340/438 |
| 11,860,588 | B1 * | 1/2024 | Spencer | G06K 7/1413 |
| 2016/0070393 | A1 * | 3/2016 | Sharma | A61B 5/7475<br>345/174 |
| 2016/0322745 | A1 * | 11/2016 | Shedletsky | G04G 17/04 |
| 2018/0184920 | A1 * | 7/2018 | Rabinovich | A61B 5/02438 |
| 2018/0271232 | A1 | 9/2018 | Yabe et al. | |
| 2020/0323315 | A1 * | 10/2020 | Lui | A44C 5/14 |
| 2021/0333759 | A1 * | 10/2021 | Vasavada | H04N 23/57 |
| 2022/0091564 | A1 * | 3/2022 | Vasavada | G04G 17/08 |
| 2022/0100148 | A1 * | 3/2022 | Vasavada | G06F 1/163 |
| 2023/0004129 | A1 * | 1/2023 | Ershov | G04G 9/007 |
| 2023/0079679 | A1 * | 3/2023 | Leith | G04G 21/02<br>368/10 |

FOREIGN PATENT DOCUMENTS

| | | | |
|---|---|---|---|
| JP | 2016-045118 | A | 4/2016 |
| JP | 2018-529948 | A | 10/2018 |
| JP | 2019-003643 | A | 1/2019 |
| JP | 2021-108048 | A | 7/2021 |
| WO | WO 2019/159500 | | 8/2019 |

OTHER PUBLICATIONS

Japanese Decision to Grant from Japanese Patent Application No. 2022-140992, dated Mar. 22, 2024, 5 pages including machine-generated English language translation.

Korean Office Action from Korean Patent Application No. 2022-0113953, dated Apr. 22, 2024, 15 pages including machine-generated English language translation.

* cited by examiner

WATCH BAND WITH FIT DETECTION

FIELD

The present description relates generally to watch bands, and, more particularly, to watch bands with detection of a user's wrist and/or characteristics thereof.

BACKGROUND

Some electronic devices may be removably attached to a user. For example, a wristwatch or fitness/health tracking device can be attached to a user's wrist by joining free ends of a watch band together.

Proximity sensors are capable of detecting the presence of a target without physical contact. They generally emit electromagnetic radiation, measure the return signal, and identify the location of the target based on the profile of the return signal. Proximity sensors are commonly used on mobile devices such as smartphones to detect accidental touchscreen taps when held to the ear during a call. Portable devices such as wristwatches may also include a proximity sensor that detects whether the watch is "off wrist" and should be turned to a locked state. However, for those users who prefer to wear their watch loosely against their wrist, such a proximity sensor may cause unintentional locking of the watch or other undesired consequences.

Accordingly, it may be beneficial to develop alternate methods or devices to more accurately determine the configuration and/or location of a wearable device relative to the user.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
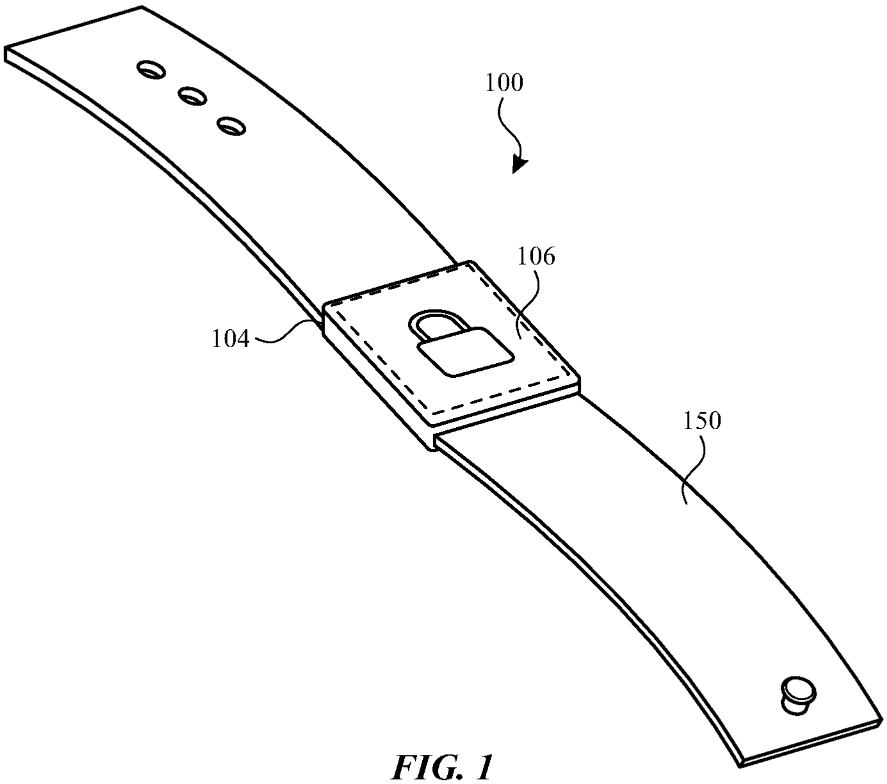
FIG. 1 illustrates a perspective view of a watch, according to some embodiments of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Embodiments described herein relate to systems and methods for detection of a configuration and/or location of a wearable device relative to a user. It should be appreciated that the various embodiments described herein, as well as functionality, operation, components, and capabilities thereof may be combined with other elements, embodiments, structures and the like, and so any physical, functional, or operational discussion of any element or feature is not intended to be limited solely to a particular embodiment to the exclusion of others.

As noted above, many portable electronic devices may be removably attached to a user. The wearable devices may be any electronic device suitable for contact with a user's skin, e.g., a phone, wristwatch, arm or wristband, headband, or any device where detection of relative surface orientation may be useful. The wearable device may be worn on a wrist, ankle, head, chest, leg, etc., with the use of a band that is flexible and capable of adjustably fitting a user. For example, the watch band may be made from a flexible material or have a structure that allows it to have an adjustable circumference. In some examples, the wearable device is a watch, smart watch, wristwatch, timekeeping device, or other wrist-worn device.

In some examples, a smart watch or a fitness device can be attached to a user's wrist by donning the watch with a watch band and/or joining free ends of a conventional watch band together. In other examples, a clasp or an elasticated band may optionally be used to secure the watch. In another example, a portable audio player may be secured to a user's arm by inserting the player into an armband case. In another example, a heart rate sensor may be attached to a user's chest by a strap.

Although many embodiments are described herein with reference to wrist bands for attaching a wrist-worn electronic device to a user, one may appreciate that other form factors may be favored in other embodiments. In other words, the methods, systems, and techniques described herein with illustrative reference to wrist-worn devices may be equally applied to non-wrist worn devices. For example, in other embodiments, devices may be configured to attach to other limbs or body portions (e.g., necklaces, arm bands, waistbands, ear hooks, finger rings, anklets, toe rings, chest wraps, head bands, etc.). Furthermore, other embodiments described herein may be applied to detect the configuration and/or location of an electronic device with respect to a non-user object such as a charging stand or station.

As noted above, some watches or other wearable devices have a capability to detect the presence of a user or other object to which it is secured. For example, proximity sensors are capable of detecting the presence of a target without physical contact. Portable devices such as wristwatches may use such detections to determine whether the watch is "off wrist" and should be turned to a locked state or provide other functions. However, for those users who prefer to wear their watch loosely against their wrist, such a proximity sensor may cause unintentional locking of the watch or other undesired consequences.

Accordingly, many embodiments described herein relate to systems and methods for detecting the configuration and/or location of a watch and/or watch band with respect to a user or other object. Such detections can be made based on changes in the watch band of the watch. For example, the watch band can have a different length, tension, curvature, securement configuration, or other characteristics when it is on the wrist of the user (i.e., "on-wrist" or "in an on-wrist configuration") relative to when it is off of the wrist of the user (i.e., "off-wrist" or "in an off-wrist configuration").

Characteristics of a watch band can change when placed in different configurations, and each of these characteristics can be correlated with each of the various configurations. The characteristics can be measured to detect in which of the various configurations the watch band is in. For example, the watch band can include a capacitor that changes its capacitance when the watch band changes its configuration. For example, the capacitance can change based on stretching of the watch band, bending of the watch band, and the like.

The watch or another device can perform one or more operations based on the detected characteristic and configuration of the watch band. For example, the watch can respond to a detection by granting or restricting access to one or more features of the watch. By further example, the watch can use a detection to further detect a size of the user's wrist. By further example, the watch can use a detection to further detect a movement, activity, and/or gesture of the user. By further example, the watch can use a detection to further detect a health metric of the user, such as blood pressure.

By further example, certain embodiments described herein take the form of methods for adjusting the fit of a wearable electronic device secured by a band to a user. Features of a band can provide a capability to automatically adjust a tightness of a band without active user input. For example, a tensioning element can be provided with a capability to alter the fit of a band in response to heat emitted by a user wearing the band.

By further example, the watch can generate a signal with an instruction to adjust the fit of the band, selecting an operational mode (e.g., tightening mode, loosening mode, flexibility mode, rigid mode, etc.) of a tensioner coupled to electronic device, and actuating the tensioning element based on the instruction.

These and other embodiments are discussed below with reference to FIGS. 1-16. However, those skilled in the art will readily appreciate that the detailed description given herein with respect to these figures is for explanatory purposes only and should not be construed as limiting.

Figure 2:
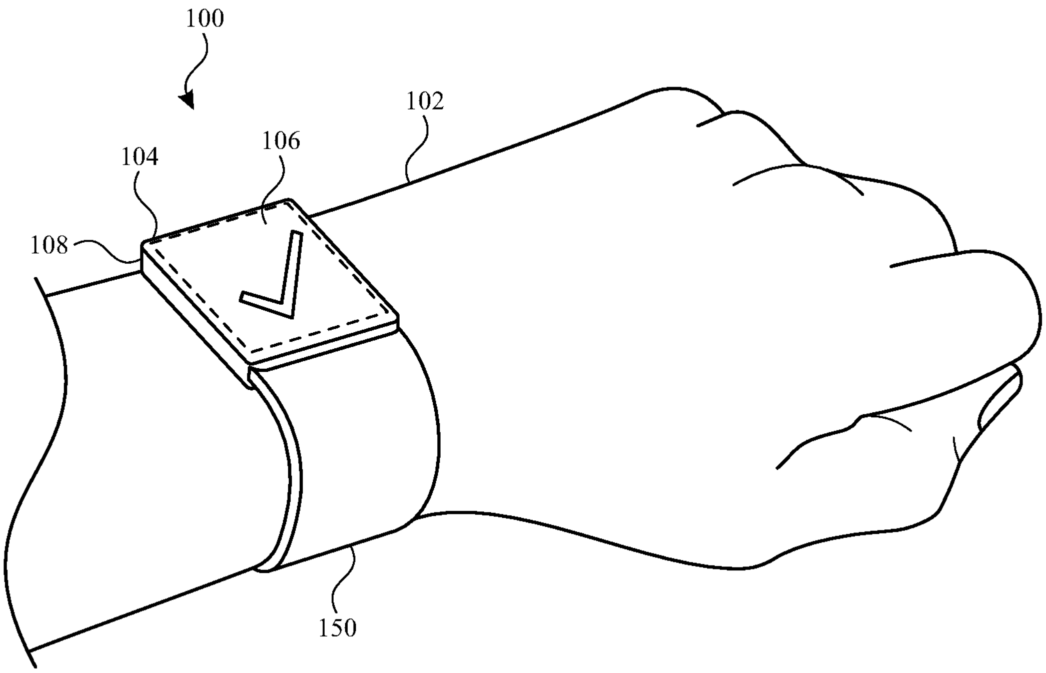
FIG. 2 illustrates a perspective view of a watch on a wrist of a user, according to some embodiments of the present disclosure.

Referring to FIGS. 1 and 2, a watch can be provided in a relaxed off-wrist configuration (FIG. 1) or in an on-wrist configuration by attaching the watch to a wrist of a user (FIG. 2).

FIG. 1 depicts a perspective view of a watch a relaxed off-wrist configuration. In the illustrated embodiment, the watch 100 is implemented as a portable electronic device that is wearable on a wrist. Other embodiments can implement the watch differently. For example, the watch can be a smart phone, a gaming device, a digital music player, a sports accessory device, a medical device, navigation assistant, accessibility device, a device that provides time and/or weather information, a health assistant, and other types of electronic device suitable for attaching to a user.

A watch body 104 of the watch 100 can include a housing 108 and a display 106. The housing 108 can form an outer surface or partial outer surface and protective case for one or more internal components of the watch 100. In the illustrated embodiment, the housing 108 is formed into a substantially rectangular shape, although this configuration is not required and other shapes are possible in other embodiments.

In some examples, the display 106 may incorporate an input device configured to receive user input. The display 106 can be implemented with any suitable technology, including, but not limited to, a multi-touch sensing touchscreen that uses liquid crystal display (LCD) technology, light emitting diode (LED) technology, organic light-emitting display (OLED) technology, organic electroluminescence (OEL) technology, or another type of display technology. In many embodiments, the display 106 can be disposed below a protective cover glass formed from a rigid and scratch resistant material such as ion-implanted glass, laminated glass, or sapphire.

As noted above, the display 106 can incorporate or be disposed proximate to an input sensor. For example, in some embodiments, the display 106 can also include one or more contact sensors to determine the position of one or more contact locations on a top surface of the display 106. In some embodiments, the display 106 can also include one or more force-sensitive elements (not shown) to detect a magnitude of force applied to the top surface of the display 106.

The watch 100 can include within the housing 108 a processor, a memory, a power supply and/or battery, network communications, sensors, display screens, acoustic elements, input/output ports, haptic elements, digital and/or analog circuitry for performing and/or coordinating tasks of the watch 100, and so on. In some examples, the watch 100 can communicate with a separate electronic device via one or more proprietary and/or standardized wired and/or wireless interfaces. For simplicity of illustration, the watch 100 is depicted in FIG. 1 without many of these elements, each of which may be included, partially, optionally, or entirely, within the housing 108.

FIG. 2 depicts a perspective view of the watch 100 in an on-wrist configuration by being attached by the watch band 150 to a user 102. The watch body 104 of the watch 100 can be coupled to the user 102 via a watch band 150 that loops around the user's wrist. The watch band 150 can be formed from a compliant material, or into a compliant structure, that is configured to easily contour to a user's wrist, while retaining stiffness sufficient to maintain the position and orientation of the watch on the user's wrist. The material selected for the watch band 150 may vary from embodiment to embodiment. For example, in certain cases, the watch band 150 can be formed from metal, such as a band formed into a metal mesh. In other embodiments, the watch band 150 can be formed from an organic material such as leather. In further examples, the watch band 150 can be formed from an inorganic material such as nylon. In still further embodiments, materials such as plastic, rubber, or other fibrous, organic, polymeric, or synthetic materials may be used.

In some examples, the watch band 150 can be removably coupled to the housing 108. For example, in certain embodiments, the watch band 150 can be at least partially looped around a watch pin that is configured to insert within lugs extending from the body of the housing 108. In other examples, the watch band 150 can be configured to slide within and be retained by two or more channels within external sidewalls of the housing 108. In other examples, the watch band 150 can be looped through and aperture in the housing 108. In other cases, the watch band 150 can be riveted, screwed, or otherwise attached to the housing 108 via one or more mechanical fasteners. In still further embodiments, additional removable couplings between the watch band 150 and the housing 108 are possible.

In other examples, the watch band 150 can be permanently coupled to the housing 108. For example, in some cases, the watch band 150 may be formed as an integral portion of the housing 108. In other cases, the watch band 150 can be rigidly adhered to the housing 108 via an adhesive. In still further embodiments, the watch band 150 can be welded, soldered, or chemically bonded to the housing 108. In other embodiments, additional permanent couplings between the watch band 150 and the housing 108 are possible.

As noted above, the housing 108 of the watch body 104 may be rigid and can be configured to provide structural support and impact resistance for electronic or mechanical components contained therein. A rigid housing is not necessarily required for all embodiments and, in some examples, the watch 100 can have a housing may be flexible. Furthermore, although watch housings are typically formed to take a rectangular shape, this is not required and other shapes are possible. For example, certain housings may take a circular shape.

In other embodiments, the watch 100 can include one or more sensors (not shown) positioned on a bottom surface of the housing 108. Sensors utilized by the watch 100 can vary from embodiment to embodiment. Suitable sensors can include temperature sensors, electrodermal sensors, blood pressure sensors, heart rate sensors, respiration rate sensors, oxygen saturation sensors, plethysmographic sensors, activity sensors, pedometers, blood glucose sensors, body weight sensors, body fat sensors, blood alcohol sensors, dietary sensors, and so on.

In many cases, sensors such as biometric sensors can collect certain health-related information non-invasively. For example, the watch 100 can include a sensor that is configured to measure changes in (or an amount of) light reflected from a measurement site (e.g., wrist) of the user 102. In one embodiment, the biometric sensor such as a PPG sensor can include a light source for emitting light onto or into the wrist of the user 102 and an optical sensor to detect light exiting the wrist of the user 102. Light from the light source may be scattered, absorbed, and/or reflected throughout the measurement sight as a function of various physiological parameters or characteristics of the user 102. For example, the tissue of the wrist of the user 102 can scatter, absorb, or reflect light emitted by the light source differently depending on various physiological characteristics of the surface and subsurface of the user's wrist.

In many cases a PPG sensor can be used to detect a user's heart rate and blood oxygenation. For example, during each complete heartbeat, a user's subcutaneous tissue can distend and contract, alternatingly increasing and decreasing the light absorption capacity of the measurement site. In these embodiments, the optical sensor of the PPG can collect light exiting the measurement site and generate electrical signals corresponding to the collected light. Thereafter, the electrical signals can be conveyed as raw data to the watch 100, which in turn can process the raw data into health data. The raw data can be based on information about the collected light, such as the chromaticity and/or luminance of the light. In some cases, the health data can be shown on the display 106 as biometric feedback to the user 102.

Depending on the configuration, location, and/or orientation of the watch 100 relative to the user 102, as detected by any of the methods described herein, the watch 100 may perform or prevent one or more operations. For example, if a detected characteristic of the watch band 150 corresponds to a configuration in which the watch 100 is "off-wrist," as illustrated in FIG. 1, then the watch 100 may be turned to a locked (i.e., where a passcode is required to access information on the device) or low power state. By further example, if the detected characteristic of the watch band 150 corresponds to a configuration in which the watch 100 is "on-wrist," as illustrated in FIG. 2, then the watch 100 may be turned to an unlocked state (i.e., where a passcode is not required to access information on the device or is only required once while the on-wrist configuration is maintained). Additionally or alternatively, other operations can be performed based on the detected characteristic, as discussed further herein. In some variations, the capacitance characteristics of the watch band may be used to detect whether the watch 100 is "on wrist" or "off wrist," as discussed further herein. Corresponding indications can be output to the user, for example via the display 106.

Figure 3:
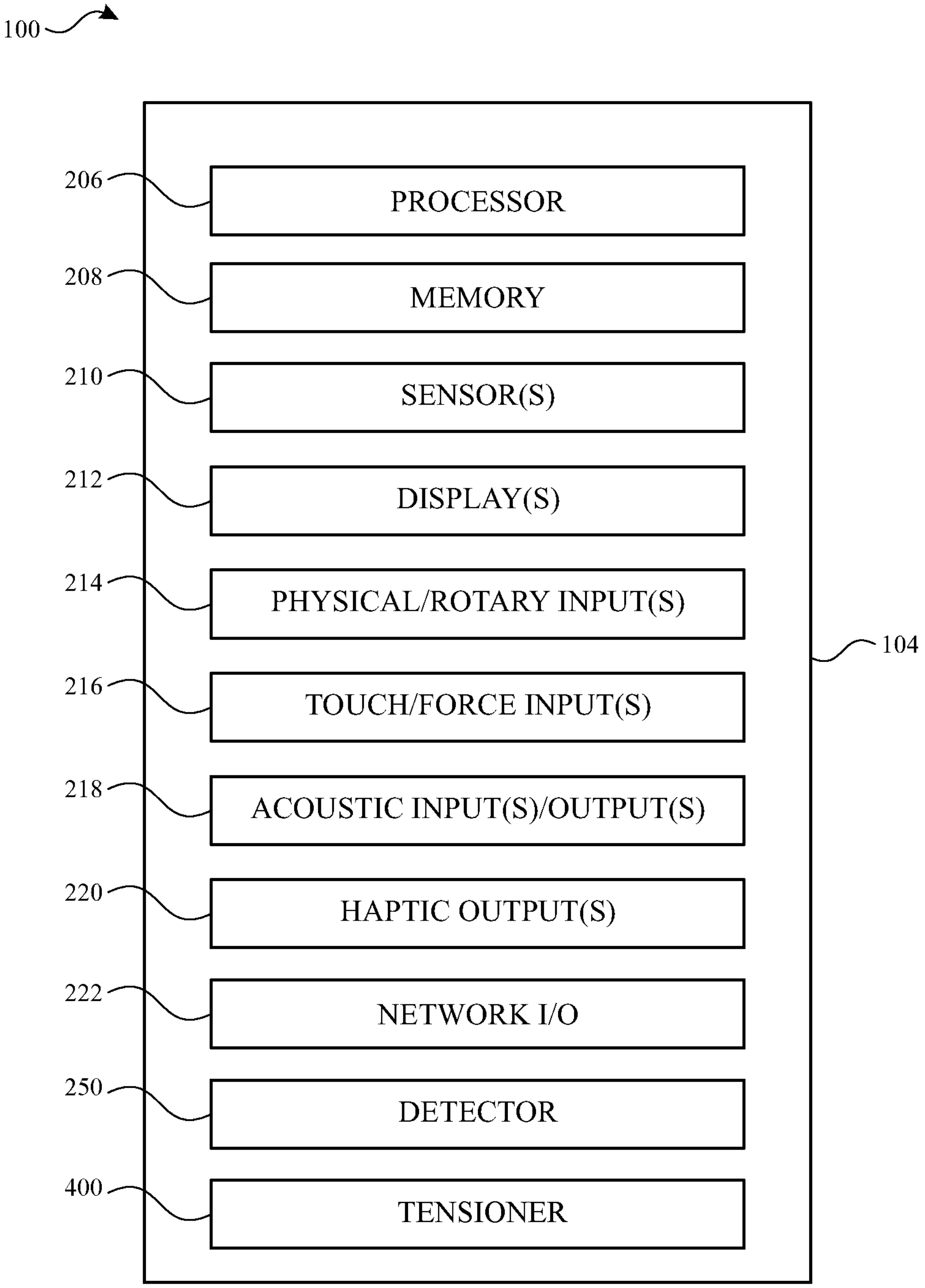
FIG. 3 depicts a simplified block diagram of a watch, according to some embodiments of the present disclosure.

FIG. 3 depicts a simplified block diagram of a watch 100 configured to perform the operations described herein. The watch 100 can one or more processing devices 206, memory 208, one or more input/output (I/O) devices or sensors 210 (e.g., biometric sensors, environmental sensors, etc.), one or more displays 212, one or more power source(s) (not shown), one or more physical and/or rotary input devices 214, one or more touch and/or force input device(s) 216, one or more acoustic input and/or output devices 218, one or more haptic output device(s) 220, one or more a network communication interface(s) 222, and one or more detectors 224. Some embodiments can also include additional components. One or more of these components can be provided on the watch body and/or the watch band of the watch. Appropriate communication connections can be provided between components, including those separated by an interface between the watch body and/or the watch band of the watch 100.

The display 212 may provide an image or video output for the watch 100. The display 212 may also provide an input surface for one or more input devices such as a touch sensing device 216, force sensing device, temperature sensing device, and/or a fingerprint sensor. The display 212 may be any size suitable for inclusion at least partially within the housing of the watch 100 and may be positioned substantially anywhere on the watch 100. In some embodiments, the display 212 can be protected by a cover glass formed from a scratch-resistant material (e.g., sapphire, zirconia, glass, and so on) that may form a substantially continuous external surface with the housing of the watch 100.

The processing device(s) 206 can control or coordinate some or all of the operations of the watch 100. The processing device 206 can communicate, either directly or indirectly with substantially all of the components of the watch 100. For example, a system bus or signal line or other communication mechanisms can provide communication between the processing device 206, the memory 208, the sensor(s) 210, the power source(s), the network communication interface 222, and/or the haptic output device 220.

The one or more processing devices 206 can be implemented as any electronic device capable of processing, receiving, or transmitting data or instructions. For example, the processing device(s) 206 can each be a microprocessor, a central processing unit (CPU), an application-specific integrated circuit (ASIC), a digital signal processor (DSP), or combinations of such devices. As described herein, the term "processing device" is meant to encompass a single processor or processing unit, multiple processors, multiple processing units, or other suitably configured computing element or elements.

The memory 208 can store electronic data that can be used by the watch 100. For example, a memory can store electrical data or content such as, for example, audio and video files, documents and applications, device settings and user preferences, timing and control signals or data for the haptic output device 220, data structures or databases, and so on. The memory 208 can be configured as any type of memory. By way of example only, the memory can be implemented as random access memory, read-only memory, Flash memory, removable memory, or other types of storage elements, or combinations of such devices.

The sensor(s) 210 can transmit and/or receive data to and from a user or another electronic device. The sensor(s) 210 can include a touch sensing input surface such as one or more buttons, one or more microphones or speakers, and/or one or more ports such as a microphone port.

The watch 100 may also include one or more sensors 210 positioned substantially anywhere on the watch 100. The sensor or sensors 210 may be configured to sense substantially any type of characteristic such as, but not limited to, images, pressure, light, touch, force, temperature, position, motion, and so on. For example, the sensor(s) 210 may be an image sensor, a temperature sensor, a light or optical sensor, an atmospheric pressure sensor, a humidity sensor, a magnet, a gyroscope, an accelerometer, and so on. In other examples, the watch 100 may include one or more health sensors. In some examples, the health sensors can be disposed on a bottom surface of the housing of the watch 100.

The power source can be implemented with any device capable of providing energy to the watch 100. For example, the power source can be one or more batteries or rechargeable batteries, or a connection cable that connects the remote control device to another power source such as a wall outlet. In other examples, wireless power can be used.

The network communication interface 222 can facilitate transmission of data to or from other electronic devices across standardized or proprietary protocols. For example, a network communication interface can transmit electronic signals via a wireless and/or wired network connection. Examples of wireless and wired network connections include, but are not limited to, cellular, Wi-Fi, Bluetooth, infrared, and Ethernet.

The haptic output device 220 can be implemented as any suitable device configured to provide force feedback, vibratory feedback, tactile sensations, and the like. For example, in one embodiment, the haptic output device 220 may be implemented as a linear actuator configured to provide a punctuated haptic feedback, such as a tap or a knock.

As noted above, the watch 100 can include a detector 250. In some embodiments, a detector can be an analog, digital, or integrated circuit configured to measure, monitor, probe, or otherwise interact with at least a portion of the watch band for determination of a characteristic thereof. The detector 250 can be or include a capacitive sensing device and the detected characteristic can be a capacitance of at least a portion of the watch band. The detector 250 can communicate with the processor 206 and/or another component and/or device to perform operations based on the characteristic (e.g., capacitance) detected by the detector 250. Such operation can include providing output to the user, performing calculations, communicating with other devices, and/or performing additional detections.

It will be understood that in certain embodiments, the watch 100 may dynamically resize the band and/or the fit of the watch. For example, as mentioned above, a tensioner 400 can be included with or coupled to the watch 100. In some examples, the tensioner 400 can be included within the housing. In other examples, the tensioner 400 can be included within the band. In still further examples, a portion of the tensioner 400 can be included within the housing and a portion of the tensioner 400 can be included within the band. In some examples, the tensioner 400 can be coupled to the band and to the housing. For example, the tensioner 400 can take the form of a coupling and/or a lug by which the band couples to the housing.

The term "tensioner" and related phrases and terminology is used herein to generally refer to structural component of a band that changes at least one feature thereof to adjust a fit of the band on a wrist or other portion of a user. For example, a circuit, apparatus, controller, or program code executed by a processor can apply a stimulus (e.g., signal, command, heat, mechanical energy, etc.) to a tensioner 400 or other portion of a watch band to effect a change therein.

Figure 4:
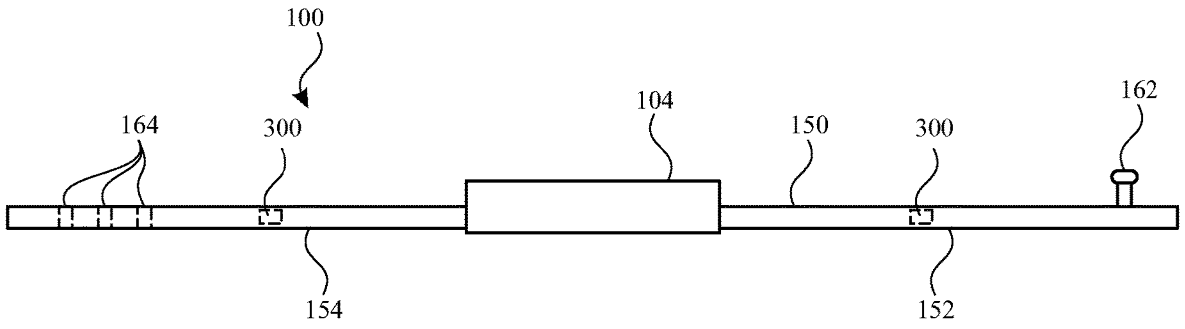
FIG. 4 illustrates a side view of a watch in a relaxed configuration, according to some embodiments of the present disclosure.
Figure 5:
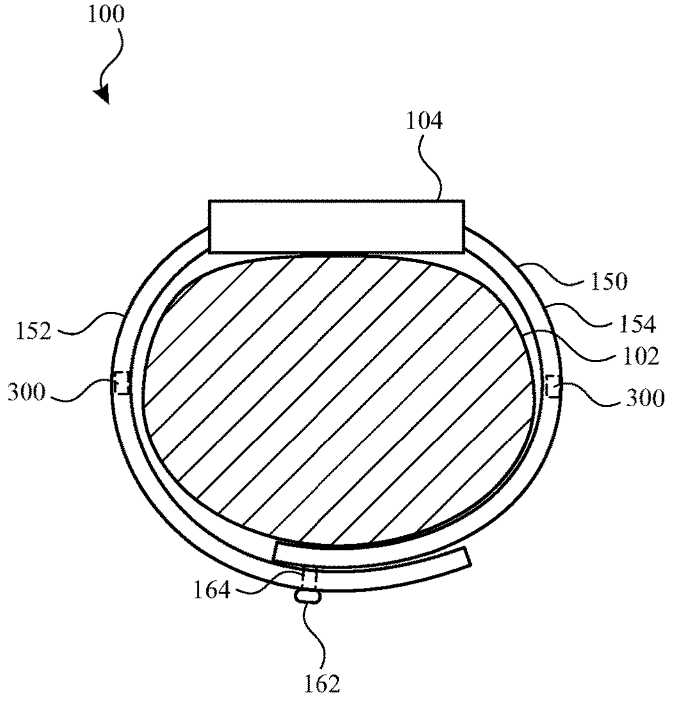
FIG. 5 illustrates a side view of the watch of FIG. 4 in a secured configuration on a wrist of a user, according to some embodiments of the present disclosure.

Referring now to FIGS. 4 and 5, a watch can be provided with an ability to be transitioned between different configurations, such as on-wrist and off-wrist configurations. Changes in the configurations can have corresponding and detectable effects on one or more characteristics of the watch band.

FIG. 4 depicts a side view of a watch in a relaxed off-wrist configuration. As shown in FIG. 4, the watch band 150 can include a first band portion 152 and a second band portion 154. The first band portion 152 can include a first engagement element 162, and the second band portion 154 can include the second engagement element 164.

The first band portion 152 and the second band portion 154 can extend away from each other and/or the watch body 104 while the watch band 150 is in the relaxed off-wrist configuration. Such a configuration can be one in which the watch band 150 is allowed to extend to a preferred position and/or orientation in the absence of external forces. Additionally or alternatively, such a configuration can be one that the watch band 150 assumes when the watch 100 is placed on a flat surface.

As shown in FIG. 5, the watch band 150 can be formed from a compliant material or into a compliant structure that is configured to easily contour to the wrist of the user 102.

The watch band 150 is illustrated as overlapping components to form a closed loop around the wrist of the user 102. In these examples, the first band portion 152 and the second band portion 154 can be affixed together. For example, the first engagement element 162 can engage the second engagement element 164 to secure the first band portion 152 and the second band portion 154 relative to each other. The first engagement element 162 and the second engagement element 164 can engage each other in one or more of a variety of configurations to provide different fits or levels of tightness on the wrist of the user 102. For example, the first engagement element 162 can include a post or other protruding member that extends away from a portion of the first band portion 152. The second engagement element 164 can be or include one or more openings extending through at least a portion of the second band portion 154. By further example, the first engagement element 162 and the second engagement element 164 can form a buckling clasp. By further example, the first engagement element 162 and the second engagement element 164 can include locks, latches, snaps, screws, clasps, threads, magnets, pins, an interference (e.g., friction) fit, knurl presses, bayoneting, hook and loop fasteners, and/or combinations thereof.

While the watch band 150 is illustrates as having overlapping components, the watch band 150 can alternatively form a single, continuous structure extending from opposing ends of the watch body 104. The watch band 150 can be expanded to don or remove the watch 100 from the wrist of the user 102 and provide sufficient tightness on the wrist of the user 102 to remain in a desired position and orientation.

When transitioning between the relaxed off-wrist configuration and the secured on-wrist configuration, the watch band can undergo a change to at least one characteristic (e.g., capacitance) in a manner that is detectable. Such detections can be made as result of a change in the length, engagement state, and/or curvature of the watch band.

In the relaxed off-wrist configuration, as shown in FIG. 4, the watch band 150 can have a first length, for example in which it is not stretched along a longitudinal axis (e.g., allowed to contract longitudinally towards the watch body 104). In the secured on-wrist configuration, as shown in FIG. 5, the watch band 150 can have a second length, different (e.g., greater) than the first length, for example in which it is stretched along the longitudinal axis (e.g., longitudinally away from the watch body 104). The stretching of the watch band 150 along its length can change at least one characteristic (e.g., capacitance) of at least a portion of the watch band 150 in a manner that is detectable by a capacitance sensor 300 of the watch band 150.

Referring now to FIGS. 6-9, a watch band can facilitate a change to at least one characteristic (e.g., capacitance) of at least a portion of the watch band when the watch band changes its configuration. The watch band 150 can include a substrate 170 and a capacitance sensor 300. The capacitance sensor 300 can be coupled to the substrate, for example by being mounted on and/or embedded within the substrate 170. The capacitance sensor 300 can include multiple plates 302 and/or electrodes that are each independently coupled to the substrate 170 to be moveable, separable, or otherwise adjustable relative to each other in response to changes in the substrate 170.

In some embodiments, the substrate 170 can be formed, at least in part, from an elastic materials, such as a polymer, elastomer, fluoroelastomeric polymer, FKM, or other polymer, such as those having a Shore durometer selected for having flexibility suitable for easily contouring to a user's wrists while maintaining sufficient stiffness to maintain support of the watch 100 when attached to the wrist of user. For example, bands of certain embodiments may have a Shore A durometer ranging from 60 to 80 and/or a tensile strength greater than 12 MPa. Some embodiments described herein include configurations in which the watch band 150 is formed, at least in part, from a non-compliant material into a compliant structure. For example, a metallic mesh can be used to form at least a portion of the watch band 150. In some embodiments, the watch band can be formed, at least in part, by joining a number of metal links. In some embodiments, the watch band can be formed, at least in part, by joining a number of glass or crystal links. In some embodiments, the watch band 150 can be formed form a combination of complaint and non-compliant materials.

The capacitance sensor 300 can include two or more plates 302, electrodes, or other structures that are formed from a metal or other conductive material that is deposited on and/or in the substrate 170. As used herein, "plates" or "electrodes" can include one or more of a variety of electrically conductive structures which can form any shape and/or span across any given area. The plates 302 can include copper, steel, aluminum, and/or another conductive metal or metal alloy. While the plates 302 are shown as being separated by the substrate 170, it will be understood that the substrate 170 or another core forming a dielectric or electrically insulative material can be provided between plates 302.

Figure 6:
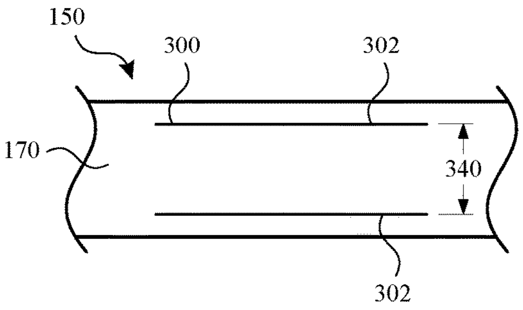
FIG. 6 illustrates a schematic side view of a portion of a watch band in a relaxed configuration and having a detector, according to some embodiments of the present disclosure.

As shown in FIG. 6, in a first configuration, the watch band 150 can provide the substrate 170 in a state that corresponds to the watch band 150 in a relatively relaxed, compressed, or unbent state. For example, the first configuration can correspond to an off-wrist configuration or an on-wrist configuration in a relatively relaxed (e.g., low tension or loose) state. In the first configuration, the plates 302 of the capacitance sensor 300 can be relatively farther from each other than in other configurations, as shown by the gap distance 340 between the plates 302. While in the first configuration, a first capacitance between the plates 302 can be provided and detected. Accordingly, a measured capacitance between the plates 302 can indicate to a detector that the watch band 150 is in the first configuration.

Figure 7:
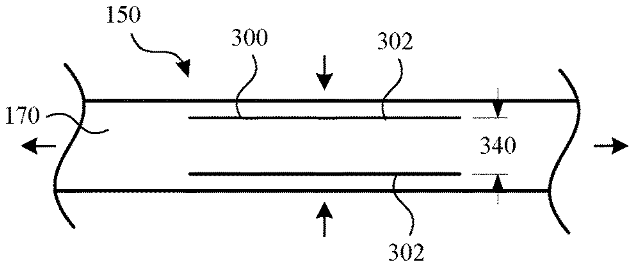
FIG. 7 illustrates a schematic side view of the portion of the watch band of FIG. 6 in a stretched configuration, according to some embodiments of the present disclosure.

As shown in FIG. 7, in a second configuration, the watch band 150 can provide the substrate 170 in a state that corresponds to the watch band 150 in a relatively stretched, bent, state. For example, the second configuration can correspond to an on-wrist configuration in a relatively stretched (e.g., high tension or tight) state. Such a change can be produced by movement of the user, swelling of the wrists, shifting of the watch, and/or operation of a tensioner. In the second configuration, the plates 302 of the capacitance sensor 300 can be relatively closer to each other than in other configurations, as shown by the gap distance 340 between the plates 302. While in the second configuration, a second capacitance between the plates 302 can be provided and detected. Accordingly, a measured capacitance between the plates 302 can indicate to a detector that the watch band 150 is in the second configuration.

As shown in FIGS. 6 and 7, the capacitance (e.g., based on the gap distance 340) can be inversely related to the tension and/or tightness of the band 150. For example, with the arrangement shown in FIGS. 6 and 7, the stretching along the longitudinal axis of the band 150 can cause corresponding narrowing of the width of the band 150, thereby causing the plates 302 to move towards each other and reduce the gap distance 340. As such, the tension in the band 150 can be related to the capacitance of the capacitive sensor 300 gap distance 340 as follows:

$$T \cong F \cong \frac{1}{D} \cong \frac{1}{C}$$

where T is the tension in the band 150, F is the force on the wrist of the user, D is the gap distance 340, and C is the capacitance of the capacitive sensor 300.

Figure 8:
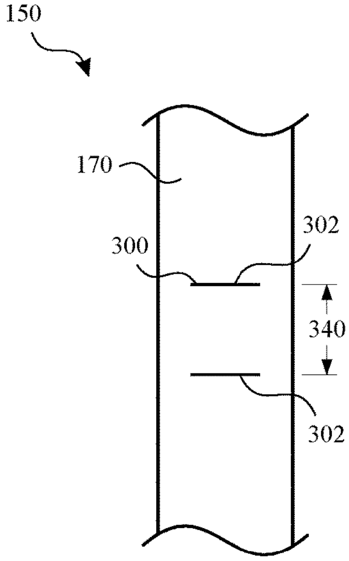
FIG. 8 illustrates a schematic front view of a portion of a watch band in a relaxed configuration and having a detector, according to some embodiments of the present disclosure.

In other arrangements, the capacitance can be directly related to the tension and/or tightness of the band 150. As shown in FIG. 8, in a first configuration, the watch band 150 can provide the substrate 170 in a state that corresponds to the watch band 150 in a relatively relaxed, compressed, or unbent state. In the first configuration, the plates 302 of the capacitance sensor 300 can be relatively closer to each other than in other configurations, as shown by the gap distance 340 between the plates 302. While in the first configuration, a first capacitance between the plates 302 can be provided and detected. Accordingly, a measured capacitance between the plates 302 can indicate to a detector that the watch band 150 is in the first configuration.

Figure 9:
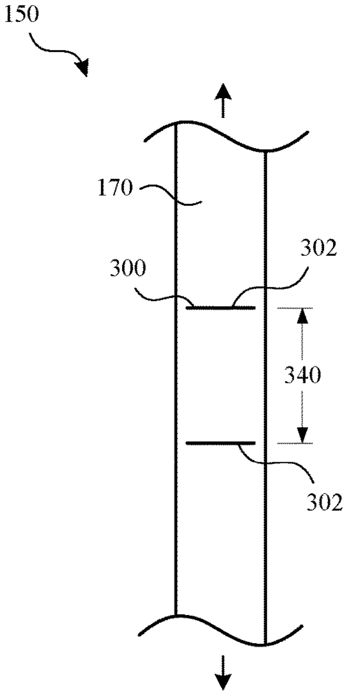
FIG. 9 illustrates a schematic front view of the portion of the watch band of FIG. 8 in a stretched configuration, according to some embodiments of the present disclosure.

As shown in FIG. 9, in a second configuration, the watch band 150 can provide the substrate 170 in a state that corresponds to the watch band 150 in a relatively stretched, bent, state. In the second configuration, the plates 302 of the capacitance sensor 300 can be relatively farther from each other than in other configurations, as shown by the gap distance 340 between the plates 302. While in the second configuration, a second capacitance between the plates 302 can be provided and detected. Accordingly, a measured capacitance between the plates 302 can indicate to a detector that the watch band 150 is in the second configuration.

As shown in FIGS. 8 and 9, the capacitance (e.g., based on the gap distance 340) can be directly related to the tension and/or tightness of the band 150. For example, with the arrangement shown in FIGS. 8 and 9, the stretching along the longitudinal axis of the band 150 can cause the plates 302 to move away from each other and increase the gap distance 340. As such, the tension in the band 150 can be related to the capacitance of the capacitive sensor 300 gap distance 340 as follows:

$$T \cong F \cong D \cong C$$

where T is the tension in the band 150, F is the force on the wrist of the user, D is the gap distance 340, and C is the capacitance of the capacitive sensor 300.

It will be further understood that any number of other configurations can be provided and detected based on corresponding changes in the capacitance between the plates 302. For example, configurations can include any between and/or beyond either of the first configuration and the second configuration.

Figure 10:
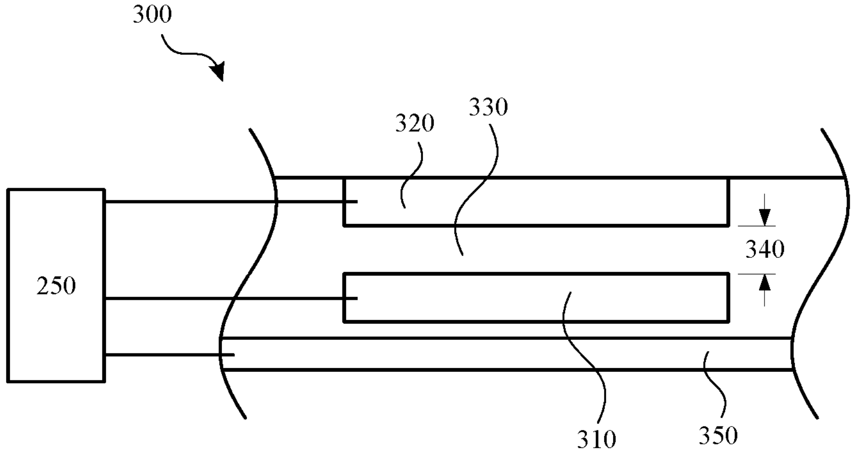
FIG. 10 illustrates a side view of a detector of a watch band, according to some embodiments of the present disclosure.
Figure 11:
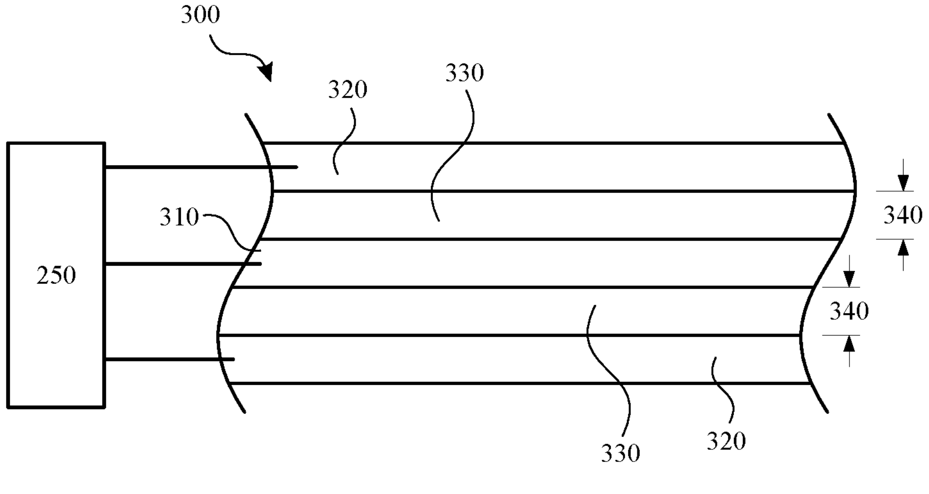
FIG. 11 illustrates a side view of a detector of a watch band, according to some embodiments of the present disclosure.

Referring now to FIGS. 10 and 11, various arrangements can be provided for a capacitance sensor. Such arrangements can facilitate accurate sensing by shielding from external influences and improving signal strength.

As shown in FIG. 10, the capacitive sensor 300 can include a ground electrode 320 and a sense electrode 310 separated by a core 330 forming a dielectric or electrically insulative material. Optionally, the electrodes disclosed herein can form plates or other conductive structures. Both the sense electrode 310 and the ground electrode 320 can be operatively connected to a detector 250. Optionally, the detector 250 can be located within a watch body of the watch or within the band.

In addition to the sense electrode 310 and the ground electrode 320, the capacitive sensor 300 can include a shield electrode 350. The shield electrode 350 can be positioned on a side of the sense electrode 310 that is opposite the ground electrode 320. By further example, the sense electrode 310 can be positioned between the ground electrode 320 and the shield electrode 350. Optionally, the shield electrode 350 can be significantly larger than the sense electrode 310. Additionally or alternatively, a portion of the shield electrode 350 can surround one or more sides of the sense electrode 310. For example, the sense electrode 310 can be positioned within a recess of the shield electrode 350, such that the shield electrode 350 surrounds multiple sides of the sense electrode 310. The shield electrode 350 or other shields can provide shielding to routing (e.g., cables, connectors, wires, and the like) and other non-electrode areas.

The shield electrode 350 can help negate and/or reduce electric field on a side of the sense electrode, such that changes in the gap distance 340 more accurately represented by the capacitance between the sense electrode 310 and the ground electrode 320. For example, providing the shield electrode 350 can reduce interference, such as parasitic capacitance or any other interfering capacitance that causes an unintended alteration in the electric field. The detector 250 can drive the shield electrode 350 with an active signal output so that it is driven at the same voltage potential of as the sense electrode 310. This helps remove any potential difference between the shield electrode 350 and the sense electrode 310. Any external interference will couple to the shield electrode 350 with minimal interaction with the sense electrode 310. Accordingly, the shield electrode 350 can help direct and focus the sensing zone to a particular area (e.g., in the direction of the ground electrode 320), reduce environmental interference, reduce parasitic capacitance, and/or eliminate temperature variation effects on the ground plane.

As shown in FIG. 11, the capacitive sensor 300 can include multiple layers of electrodes and/or plates. For example, the capacitive sensor 300 can include a sense electrode 310 that is positioned between ground electrodes 320 on opposing sides of the sense electrode 310. The sense electrode 310 can be separated from each of the ground electrode 320 by a corresponding core 330 forming a dielectric or electrically insulative material. The sense electrode 310 and each of the ground electrodes 320 can be operatively connected to a detector 250. Optionally, the detector 250 can be located within a watch body of the watch or within the band.

By providing multiple ground electrodes 320 on opposing sides of the sense electrode 310, both cores 330 can alter their corresponding gap distances 340 upon changes in the band. Accordingly, changes in the capacitance sensed by the sense electrode 310 and can be effectively doubled compared to another arrangement in which only one ground electrode 320 is provided. It will be understood that yet other electrodes can be provided to alter (e.g., amplify) the effect of the changes. By providing a more amplified capacitance, the changes can be more easily detected and with greater precision.

It will be understood that the arrangements illustrated in FIG. 10 and FIG. 11 can be combined, such as to provide a shield electrode as shown in FIG. 10 along with the sense electrode 310 and ground electrodes 320 of FIG. 11. Such a shield electrode can be positioned on a side of the ground electrodes 320 and/or the sense electrode 310 to direct the detection of electric fields.

The watch can respond to detections based on the capacitance sensor to alter a fit of the band. For example, the watch 100 can include a tensioner 400 in order to provide dynamic adjustment of the fit of the watch 100. The tensioner may alter the fit of the watch 100 in a number of ways. For example, the tensioner can adjust one or more dimensions of a band coupled to the watch. In another example, the tensioner can adjust a coupling between a band and the watch body. In another example the tensioner can adjust the position of the housing of the watch relative to the band. In still other embodiments, other adjustments are possible.

Figure 12:
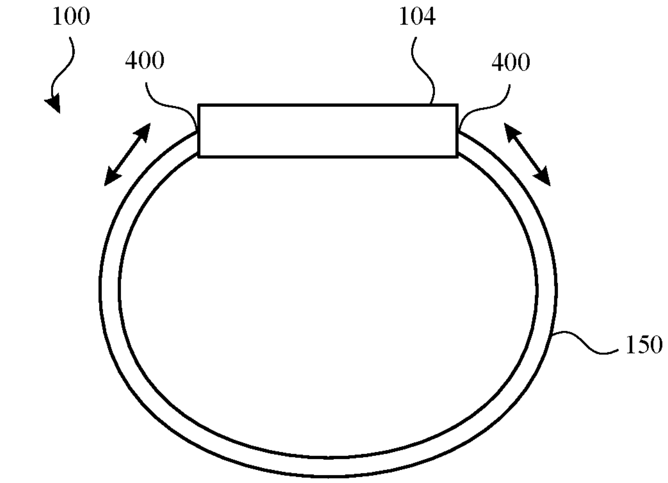
FIG. 12 illustrates a side view of a watch with adjustable fit capabilities, according to some embodiments of the present disclosure.

In some embodiments, as shown in FIG. 12, the effective length of the band 150 can be increased or decreased in order to adjust the fit of the watch 100. This type of adjustment can be referred to as a "fastening force." In these embodiments, the shorter the length of the band 150, the tighter the fit of the watch 100 may be. Similarly, the longer the length of the band 150, the looser the fit of the watch 100 may be. Length adjustments to the band 150 are shown in FIG. 12 with bi-directional arrows. As shown, the length need not change along every portion of the band 150 to achieve a change in the effective length of the band 150.

Figure 13:
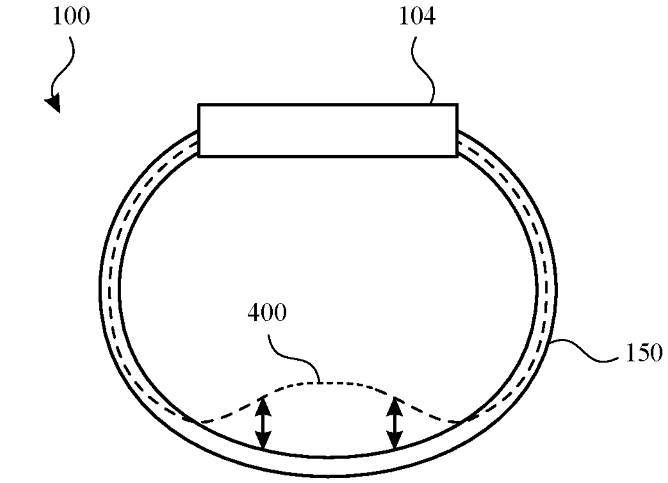
FIG. 13 illustrates a side view of a watch with adjustable fit capabilities, according to some embodiments of the present disclosure.

In some embodiments, as shown in FIG. 13, the shape of the band 150 can be adjusted in order to adjust the fit of the watch 100. This type of adjustment can be referred to as a "coiling force." For example, a cross-sectional shape of the band 150 can be defined by an inner periphery of the band 150, such as along a user engagement surface of the band 150. The band 150 can define multiple cross-sectional dimensions, defined by a distance between opposing inner surfaces of the band 150. It will be understood that the housing of the watch body 104 can also provide an end that defines the cross-sectional dimension. Where a change of the shape of the band 150 changes at least one cross-sectional dimension of the band 150, the fit of the watch 100 can be altered by changing a force applied by the portions of the band 150 that define the altered cross-sectional dimension. In these embodiments, the shorter the cross-sectional dimension of the band 150, the tighter the fit of the watch 100 may be. Similarly, the greater the cross-sectional dimension of the band 150, the looser the fit of the watch 100 may be. Shape adjustments to the band 150 are shown in FIG. 13 with bi-directional arrows. As shown, the shape need not change along every portion of the band 150.

Figure 14:
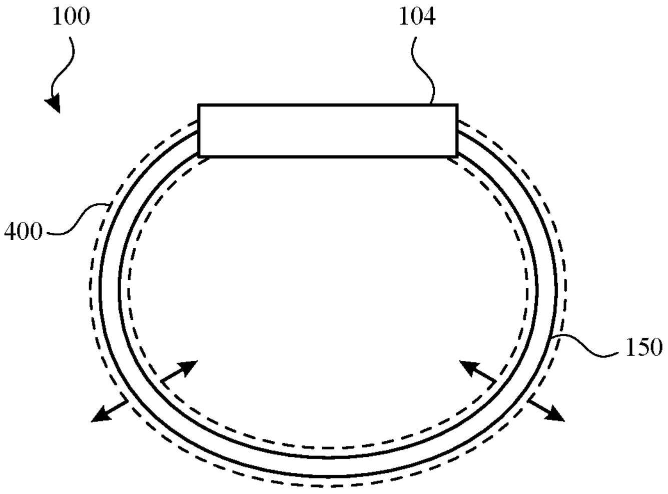
FIG. 14 illustrates a side view of a watch with adjustable fit capabilities, according to some embodiments of the present disclosure.

In some embodiments, as shown in FIG. 14, the thickness of the band 150 can be increased or decreased in order to adjust the fit of the watch 100. This type of adjustment can be referred to as a "pressure." In these embodiments, the thicker the band 150, the tighter the fit of the watch 100 may be. Similarly, the thinner the band 150, the looser the fit of the watch 100 may be. Thickness adjustments to the band 150 are shown in FIG. 14 with a bi-directional arrows. As shown, the thickness need not change along every portion of the band 150.

Adjustments described herein can be effected by application of a stimulus, such as mechanical energy, heat, electrical signals, and the like. Such stimuli can result in adjustments to the tightness as described herein by moving one or more portions of the watch body and/or band. Corresponding structures, such as motors, actuators, pumps, inflatable bladders, electroactive materials, thermally-responsive materials, and the like can be provided to achieve such adjustments.

It will be understood that any given band can provide one or more of the adjustments illustrated in FIGS. 12-14 and/or other adjustments. It will be further understood that the adjustments illustrated in FIGS. 12-14 and/or other adjustments may apply equally or equivalently to other band and/or watch embodiments described herein. More generally, it should be appreciated that the various examples and embodiments presented herein can apply equally or equivalently to many band and/or watches and no single embodiment, or adjustments thereto by a tensioner or the watch itself, should be considered as limited to that single embodiment.

Figure 15:
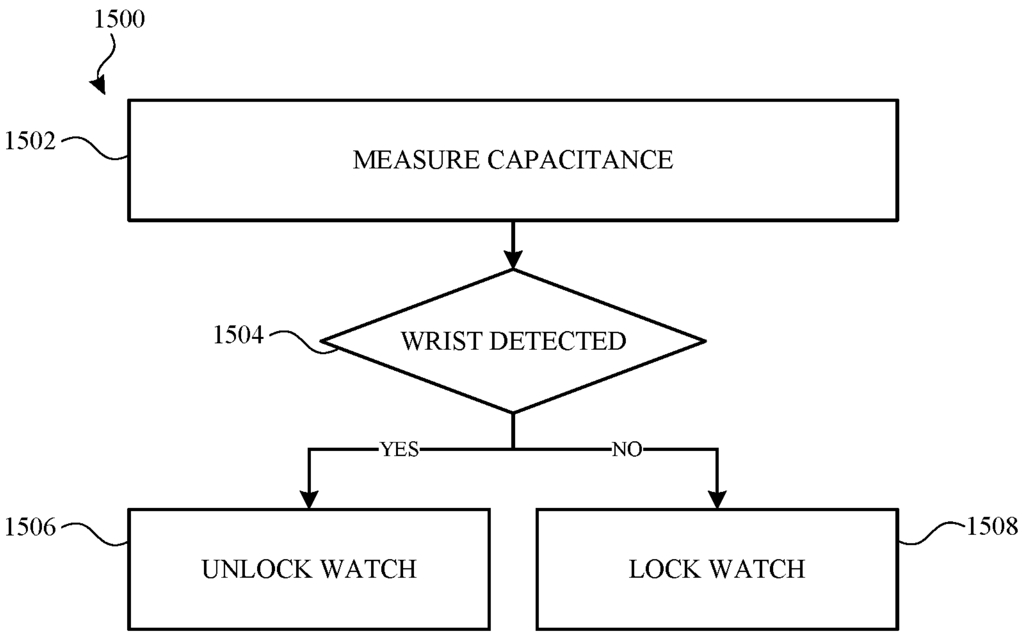
FIG. 15 illustrates a flow chart of operations for a watch, according to some embodiments of the present disclosure.
Figure 16:
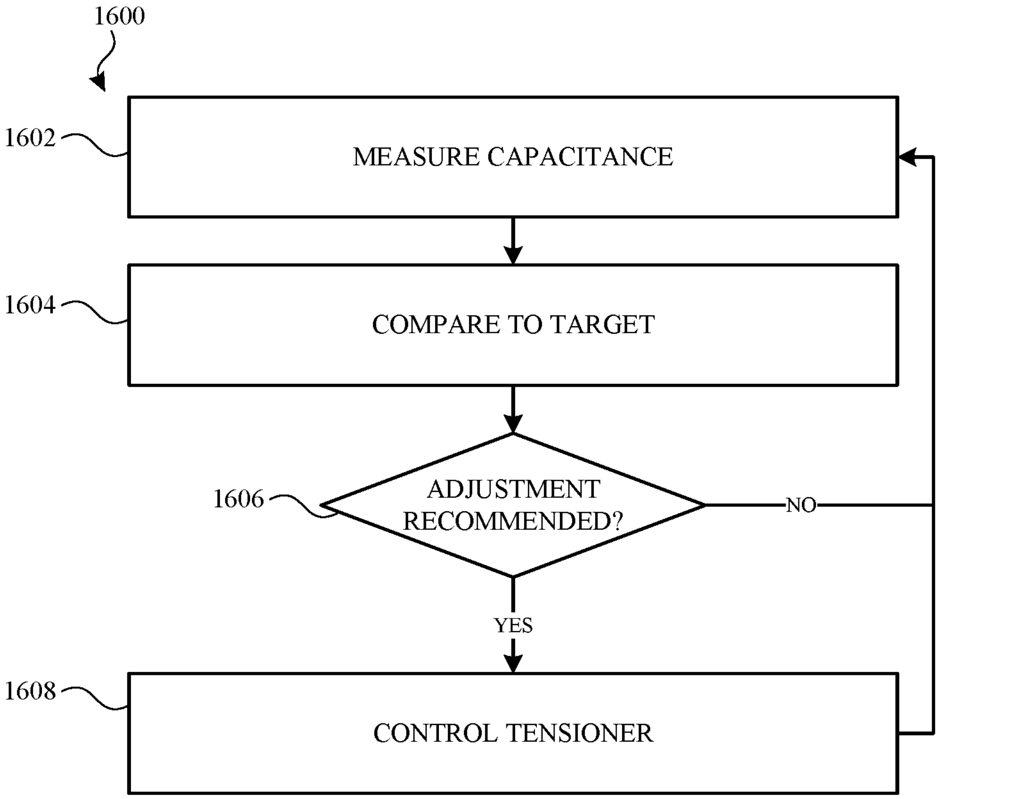
FIG. 16 illustrates a flow chart of operations for a watch, according to some embodiments of the present disclosure.

Referring now to FIGS. 15 and 16, the watch can perform an action that has been determined to be associated with the detected characteristic (e.g., capacitance) and/or changes thereof. The action corresponding to the detected characteristic can include instructions for execution by a processor and/or other components of the watch. Alternatively or additionally, the action can include causing another device, apart from the electronic device, to execute instructions. The action can be performed automatically upon detection of the characteristic. Additionally or alternatively, the watch can provide a prompt requesting user confirmation of the action, and the action can be performed after user confirmation is received. Additionally or alternatively, a user can manually override or modify the action.

Actions performed by the watch 100 in response to detection of a characteristic include actions outside of the regular operation of the watch 100. For example, the watch 100 can perform actions that are only available when a band is detected to be in a particular configuration.

In some embodiments, a detection of a characteristic can serve as authorization for otherwise unavailable actions. For example, the watch can be locked when in an off-wrist configuration. By further example, the watch can be unlocked or unlockable when in an on-wrist configuration.

FIG. 15 illustrates a flow diagram of an example process 1500 for determining an operational state of a watch based on a detected capacitance. For explanatory purposes, the process 1500 is primarily described herein with reference to the watch 100 of FIGS. 1-5. However, the process 1500 is not limited to the watch 100 of FIGS. 1-5, and one or more blocks (or operations) of the process 1500 may be performed by different components of the watch and/or one or more other devices. Further for explanatory purposes, the blocks of the process 1500 are described herein as occurring in serial, or linearly. However, multiple blocks of the process 1500 may occur in parallel. In addition, the blocks of the process 1500 need not be performed in the order shown and/or one or more blocks of the process 1500 need not be performed and/or can be replaced by other operations.

The process 1500 can begin when the watch 100 measures a capacitance of a capacitance sensor, such as of a band (1502). The measurement can optionally be taken by a detector of a watch body based on conditions at the band. The measured capacitance can be evaluated to determine whether it corresponds to a condition in which the watch is on a wrist of a user (1504). For example, predetermined capacitance values can be associated with on-wrist and off-wrist configurations. In some embodiments, where the wrist is detected to be present, the watch can be unlocked and or unlockable (e.g., with a prompt for a user to provide a passcode). Where the wrist is detected to be not present, the watch can be locked. It will be understood that other actions can be assigned to each of the detectable on-wrist and off-wrist configurations.

FIG. 16 illustrates a flow diagram of an example process 1600 for controlling a tension of a watch based on a detected capacitance. For explanatory purposes, the process 1600 is primarily described herein with reference to the watch 100 of FIGS. 1-5 and 12-14. However, the process 1600 is not limited to the watch 100 of FIGS. 1-5 and 12-14, and one or more blocks (or operations) of the process 1600 may be performed by different components of the watch and/or one or more other devices. Further for explanatory purposes, the blocks of the process 1600 are described herein as occurring in serial, or linearly. However, multiple blocks of the process 1600 may occur in parallel. In addition, the blocks of the process 1600 need not be performed in the order shown and/or one or more blocks of the process 1600 need not be performed and/or can be replaced by other operations.

The process 1600 can begin when the watch 100 measures a capacitance of a capacitance sensor, such as of a band (1602). The measurement can optionally be taken by a detector of a watch body based on conditions at the band. The measured capacitance can be compared to a target value that corresponds to a preferred tightness of the band on the wrist of the user (1604). Based on the comparison, the watch can determine whether an adjustment to the tightness is recommended. (1606). If an adjustment is recommended, a tensioner can be operated to adjust the tightness, as described herein. The process 1600 can optionally be repeated so that adjustments are performed according to a closed-loop approach until the target is achieved. Such adjustments can be made dynamically and/or without the need for user input. Additionally or alternatively, the watch can provide information to the user regarding the capacitance, tightness, etc. and allow the user to manually make adjustments.

Additional and/or alternative actions performed by the watch in response to detection of a characteristic include influencing regular operation of the watch. For example, the regular operation of the watch can be maintained with additional or altered features based on the detected characteristic. As such, the user's experience with the watch during its regular operation is enhanced.

In some embodiments, upon detection of a characteristic, the watch provides a feature of a visual user interface that corresponds to a characteristic of the band 110.

In some embodiments, upon detection of a characteristic, other settings of the watch can be modified. A band in a given configuration can be associated with an activity that is supported by the watch. For example, the watch can display particular information, track activity of the user, take a biometric reading, record a location of the user, launch an activity tracking app, and/or modify notifications settings (e.g., to be more prominent).

In some embodiments, the watch can perform detections and take actions in a manner that is not necessarily perceivable by a user. For example, a watch can track usage of one or more bands and the configurations thereof. The tracked usage information includes dates, times, durations, locations, activities, biometrics of the user, and/or environmental features in relation to periods before, during, and/or after usage of each band. The tracked usage information can be collected during a background process of the watch. The tracked usage information can be output to a user or uploaded to an external device for analysis. The tracked usage information can be used for machine learning in relation to how each band is used.

The watch can perform a variety of other actions upon identification of a band 150. It will be recognized that the detection of a characteristic can be followed by any associated action that can be performed by the watch. For example, where the watch has the required capabilities, the watch launches an app, opens a website, starts a timer, displays a message, provides an alert, communicates with another device, and/or other functions.

Accordingly, watch bands described herein can facilitate a watch's ability to perform one or more operations based on the detected characteristic and configuration of the watch band. Characteristics of a watch band can change when placed in different configurations, and each of these characteristics can be correlated with each of the various configurations. The characteristics can be measured to detect in which of the various configurations the watch band is in. For example, the watch band can include an adjustable capacitor that changes it capacitance when the watch band changes its configuration. For example, the capacitance can change based on stretching of the watch band, bending of the watch band, and/or securement and release of an engagement element. The watch or another device can perform one or more operations based on the detected characteristic and configuration of the watch band.

Various examples of aspects of the disclosure are described below as clauses for convenience. These are provided as examples, and do not limit the subject technology.

Clause A: a watch comprising: a watch body comprising a detector; and a watch band configured to be coupled to the watch body and comprising: a substrate of an elastic material; and conductive plates positioned to move relative to each other as the substrate stretches, wherein the detector of the watch body is configured to: measure a capacitance between conductive plates; and perform an operation based on the capacitance.

Clause B: a watch band comprising: a core configured to transition between a first configuration when the watch band defines a first dimension and a second configuration when the watch band defines a second dimension, different than the first dimension; and conductive plates configured to provide a first capacitance while the core is in the first configuration and a second capacitance, different than the first capacitance, while the core is in the second configuration.

Clause C: a watch band comprising: a substrate configured to stretch in at least one dimension; a ground electrode; a sense electrode separated from the ground electrode by a core that is configured to compress or expand as the substrate stretches in the at least one dimension; and a shield electrode on a side of the sense electrode that is opposite the ground electrode, the shield electrode being operable to reduce an electric field on a side of the sense electrode that is opposite from the ground electrode.

One or more of the above clauses can include one or more of the features described below. It is noted that any of the following clauses may be combined in any combination with each other, and placed into a respective independent clause, e.g., clause A, B, or C.

Clause 1: the detector is further configured to detect, based on the capacitance, whether the watch band is securing the watch to a wrist of a user.

Clause 2: the detector detects, based on the capacitance, that the watch band is not securing the watch to the wrist of the user, the detector is further configured to prevent access to at least one function of the watch until a passcode is provided.

Clause 3: the detector is further configured to detect, based on the capacitance, a tension across the watch band.

Clause 4: the watch band further comprises a tensioner configured to alter an effective length of the watch band.

Clause 5: the tensioner is configured to alter the effective length of the watch band based on the capacitance.

Clause 6: the conductive plates comprise: a ground electrode on a first side of the core; a sense electrode on a second side of the core; and a shield electrode on the second side of the core, the sense electrode being between the ground electrode and the shield electrode to reduce an electric field on a side of the sense electrode that is opposite from the ground electrode.

Clause 7: the conductive plates comprise: a first ground electrode; a second ground electrode; and a sense electrode between the first ground electrode and the second ground electrode.

Clause 8: the sense electrode is separated from the first ground electrode by the core; and the sense electrode is separated from the second ground electrode by an additional core.

Clause 9: the first configuration is achieved when the watch band is securing a watch to a wrist of a user; and the second configuration is achieved when the watch is removed from the wrist of the user.

Clause 10: the first dimension is a length of the watch band in a relaxed configuration; and the second dimension is a length of the watch band in a stretched configuration.

Clause 11: in the first configuration, the watch band is under a first tension; and in the second configuration, the watch band is under a second tension, different than the first tension.

Clause 12: the watch band further comprises: a first band portion having a first engagement element; and a second band portion having a second engagement element; in the first configuration, the first engagement element engages the second engagement element; and in the second configuration, the first engagement element does not engage the second engagement element.

Clause 13: the shield electrode is larger than the sense electrode.

Clause 14: a watch body comprising a detector operably connected to the ground electrode, the sense electrode, and the shield electrode.

Clause 15: the detector is configured to drive the sense electrode and the shield electrode at a same voltage.

Clause 16: the core is configured to transition between a first configuration when the watch band defines a first dimension and a second configuration when the watch band defines a second dimension, different than the first dimension; and the sense electrode and the ground electrode are configured to provide a first capacitance while the core is in the first configuration and a second capacitance, different than the first capacitance, while the core is in the second configuration.

Clause 17: an additional ground electrode on a side of the sense electrode.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A watch comprising:

a watch body comprising a detector; and a watch band configured to be coupled to the watch body and comprising:

a substrate of an elastic material; and conductive plates positioned to move relative to each other as the substrate stretches, wherein the detector of the watch body is configured to:

measure a capacitance between conductive plates; and perform an operation based on the capacitance.

2. The watch of claim 1, wherein the detector is further configured to detect, based on the capacitance, whether the watch band is securing the watch to a wrist of a user.

3. The watch of claim 2, wherein the detector detects, based on the capacitance, that the watch band is not securing the watch to the wrist of the user, the detector is further configured to prevent access to at least one function of the watch until a passcode is provided.

4. The watch of claim 1, wherein the detector is further configured to detect, based on the capacitance, a tension across the watch band.

5. The watch of claim 4, wherein the watch band further comprises a tensioner configured to alter an effective length of the watch band.

6. The watch of claim 5, wherein the tensioner is configured to alter the effective length of the watch band based on the capacitance.

7. A watch band comprising:

a core configured to transition between a first configuration when the watch band defines a first dimension and a second configuration when the watch band defines a second dimension, different than the first dimension; and conductive plates configured to provide a first capacitance while the core is in the first configuration and a second capacitance, different than the first capacitance, while the core is in the second configuration.

8. The watch band of claim 7, wherein the conductive plates comprise:

a ground electrode on a first side of the core;

a sense electrode on a second side of the core; and a shield electrode on the second side of the core, the sense electrode being between the ground electrode and the shield electrode to reduce an electric field on a side of the sense electrode that is opposite from the ground electrode.

9. The watch band of claim 7, wherein the conductive plates comprise:

a first ground electrode;

a second ground electrode; and a sense electrode between the first ground electrode and the second ground electrode.

10. The watch band of claim 9, wherein:

the sense electrode is separated from the first ground electrode by the core; and the sense electrode is separated from the second ground electrode by an additional core.

11. The watch band of claim 7, wherein:

the first configuration is achieved when the watch band is securing a watch to a wrist of a user; and the second configuration is achieved when the watch is removed from the wrist of the user.

12. The watch band of claim 7, wherein:

the first dimension is a length of the watch band in a relaxed configuration; and the second dimension is a length of the watch band in a stretched configuration.

13. The watch band of claim 7, wherein:

in the first configuration, the watch band is under a first tension; and in the second configuration, the watch band is under a second tension, different than the first tension.

14. The watch band of claim 7, wherein:

the watch band further comprises:

a first band portion having a first engagement element; and a second band portion having a second engagement element;

in the first configuration, the first engagement element engages the second engagement element; and in the second configuration, the first engagement element does not engage the second engagement element.

15. A watch band comprising:

a substrate configured to stretch in at least one dimension;

a ground electrode;

a sense electrode separated from the ground electrode by a core that is configured to compress or expand as the substrate stretches in the at least one dimension; and a shield electrode on a side of the sense electrode that is opposite the ground electrode, the shield electrode being operable to reduce an electric field on a side of the sense electrode that is opposite from the ground electrode.

16. The watch band of claim 15, wherein the shield electrode is larger than the sense electrode.

17. A watch comprising:

the watch band of claim 15; and a watch body comprising a detector operably connected to the ground electrode, the sense electrode, and the shield electrode.

18. The watch of claim 17, wherein the detector is configured to drive the sense electrode and the shield electrode at a same voltage.

19. The watch of claim 15, wherein:

the core is configured to transition between a first configuration when the watch band defines a first dimension and a second configuration when the watch band defines a second dimension, different than the first dimension; and the sense electrode and the ground electrode are configured to provide a first capacitance while the core is in the first configuration and a second capacitance, different than the first capacitance, while the core is in the second configuration.

20. The watch of claim 15, further comprising an additional ground electrode on a side of the sense electrode.

* * * * *